United States Patent [19]

Solomon

[11] 3,812,793

[45] May 28, 1974

[54] APPARATUS FOR TREATING NOXIOUS EFFLUENTS

[75] Inventor: Raymond Lewis Solomon, Deming, N. Mex.

[73] Assignees: William J. Trayler; Lois J. Trayler, both of Edmund, Ohio ; part interest to each

[22] Filed: Apr. 19, 1972

[21] Appl. No.: 245,334

[52] U.S. Cl. ................. 110/8 R, 110/8 A, 110/119, 55/223, 55/228, 261/17
[51] Int. Cl. ............................................. F23g 3/00
[58] Field of Search ............. 110/8 R, 8 A, 10, 119; 261/17, 18 R; 55/223, 228

[56] References Cited
UNITED STATES PATENTS 2,833,528  5/1958  Schroeder ............................ 261/21
3,520,113  7/1970  Stokes ................................... 55/223
3,563,188  2/1971  Prosser ............................... 110/8 A
3,572,264  3/1971  Mercer .............................. 110/8 R Primary Examiner—Kenneth W. Sprague
Assistant Examiner—James C. Yeung
Attorney, Agent, or Firm—Dunlap, Laney, Hessin, Dougherty & Codding

[57] ABSTRACT

A system of uncomplicated structure which lends itself to unskilled manual operation for treating the output of a furnace, burner, or the like, in which the furnace output is cooled, directed and forced into a treating tank containing a scrubbing fluid, and exposed to a burner flame before being discharged into the atmosphere. The system is of particular use in ensuring that the output from the burner or furnace contains no noxious effluents.

4 Claims, 1 Drawing Figure

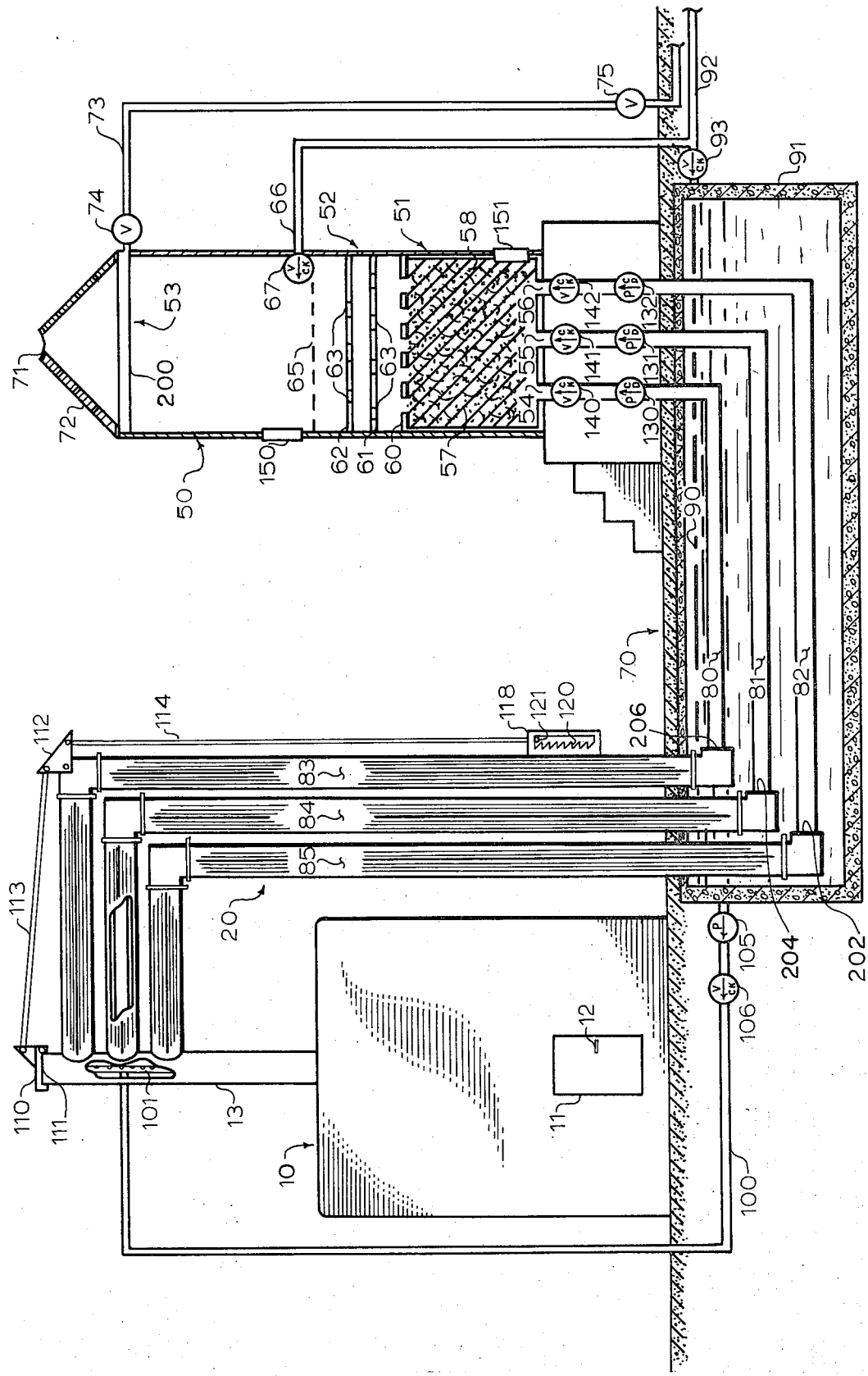

3,812,793

APPARATUS FOR TREATING NOXIOUS EFFLUENTS

BACKGROUND OF THE INVENTION

1. Field of the Invention

This invention relates to improvments in anti-air pollution devices, and more particularly to improvements in apparatus for filtering and treating furnace or burner emissions to reduce noxious effluents introduced into the atmosphere.

2. Description of the Prior Art

Of recently increasing concern is the ecologists' drive against pollution, particularly to noxious effluents fouling the air. In response to this outcry, many devices and apparatuses have been and are being advanced in efforts to reduce or eliminate completely the discharge of such harmful effluents.

To date, many of the apparatuses advanced include or require for operation very complex machinery, many moving parts, and, in fact, some apparatuses involve complicated grids upon which chemical reactions may take place to remove but selected gases or elements. Although this selective removal is, of course, commendable in its ultimate goal of removing the most harmful gases from the discharge, such devices, nevertheless, may not remove all of the noxious ingredients, discharging, perhaps, some less harmful, but perhaps deadly, gases or particles into the air.

Furthermore, such sophisticated effluent treating apparatuses of complicated or complex operation require a high degree of skill to operate and maintain, an attribute which, because of the difficulty of obtaining properly trained personnel, may result in degraded operation which may be tantamount to directly discharging the effluent into the air.

SUMMARY OF THE INVENTION

In light of the above, it is, therefore, an object of the invention to provide a system for removing noxious effluents from a furnace or burner outlet.

It is a further object of the invention to provide a system for removing harmful effluents from a gas for discharge into the air which is of uncomplex structure and operation.

It is yet another object of the invention to provide apparatus for removing harmful effluents from a gas in which the gas is treated both chemically and subjected to a second burning process.

It is still another object of the invention to provide apparatus for removing noxious effluents from a gas which does not require highly skilled personnel for operation.

It is yet another object of the invention to provide a system for removing noxious effluents from a gas which includes safety mechanisms to ensure that the system is not subjected to extreme temperatures or pressures.

It is still another object of the invention to provide a system for treating the output from a burner to enable its discharge into the air.

It is still another object of the invention to provide a system for treating the output of a burner or furnace which subjects the output to both chemical scrubbing and subsequent reburning to ensure pure emission.

It is yet another object of the invention to provide a system for treating an output from a burner or burners which precools the output before treatment.

These and other objects, features, and advantages will become apparent to those skilled in the art from the following detailed description when read in conjunction with the appended claims and accompanying drawings.

In accordance with the invention, in its broad aspects, a system is provided for treating the output of a burner, furnace, or the like, which includes means for directing the output to a treatment of purification tank in which the output is scrubbed by being directed through a scrubbing fluid and subsequently exposed to an open flame to reburn any matter not removed by the chemical scrubbing. The output of the furnace may be injected under pressure created by pressure-producing means to be forced through the scrubbing fluid. Also, means may be provided for cooling the output pipes to prevent damage in the event that the furnace or burner temperature becomes too high, and, additionally, means are provided by which the pressure within the output pipes may be relieved in the event that it becomes hazardously high.

DETAILED DESCRIPTION OF THE PREFERRED EMBODIMENTS

The invention is illustrated in the sole FIGURE of the drawing. As shown, the purifier, in accordance with the invention, may be used in conjunction with a furnace 10 or other machinery or apparatus which emits into the air substances such as smoke, gases, noxious fumes, or the like. As shown, the furnace 10 includes a door 11 opened by a handle 12, or the like, by which trash or other material to be disposed of may be inserted into the furnace. It should be understood that although the invention is described with particular reference to a furnace, it is not intended by the disclosure thereof to limit its application to furnaces, but it is intended that it be used with any noxious gas or particle emitting or smoke producing apparatuses, as above said. The furnace 10 may include a chimney 13 through which the output (not shown) of the furnace (hereinafter referred to merely as output) is conducted. The output is treated in a treating tank 50, having been conducted thereto from the chimney 13 via pipes or tubes 20, which run through a tank 70 having a fluid, such as water or the like, all as below described in detail.

The treating tank 50 includes an inlet section 51, a baffle section 52 and a burner output section 53. In operation, the output from the furnace 10, conducted via tubes 20, is entered into the treating tank 50 in the base thereof, by holes or ports 54, 55, and 56. Disposed within the inlet section 51 of the treating tank 50 is a water and chemical mixture 57, which may include a detergent or other substance, the particular choice of which depends upon the nature of the gas treated and the particular content of the noxious substance or substances desired to be removed therefrom. If desired, as shown, the input section 57 may include a webbing or matrix 58 through which the gases are forced, as illustrated.

The gases, because they may be under considerable pressure when inputted into the treating tank 50, may create considerable turbulence or disturbance within the input fluid of the input tank 51. Therefore, a plurality of baffles, 60, 61, and 62, may be provided extending across the tank 50, which may have offset slots, holes, or the like, generally denoted by reference numeral 63, therethrough to minimize such turbulence.

The matrix 58 may be conveniently held in place and contained by the first baffle plate 60, which may, as shown, be the top of an overall container in which the matrix is disposed.

The fluid 65 within the tank may be maintained at a predetermined level, for example, by an input water line 66. If desired, the operation of the input water line 66 may be manually controlled (manual control not shown) or, alternatively, may be controlled by a float or check valve 67 within the treating tank 50.

After the output from the furnace 10 has traversed the fluid and the baffles, it is traversed through burner elements 200 extending across the treating tank 50 above the water level. The burner element 200 burns any remaining materials which were not filtered within the matrix 58 and the scrubbing fluid 65. The output gas is then exited through hole 71 in conical shaped top 72 of the treating tank 50. The burners 200 may receive a supply of natural gas from gas line 73 controlled by a valve 74 automatically, or by a manual valve 75 at ground level. The gas burner 200 may be arranged such that the flames burn inwardly, for example, in a ring, at an angle of approximately 45° upward in the direction of the output hole 71 of the treating tank 50 thereby creating a suction to pull any fumes within the tank through the fire and burning any gases or fumes that might come out of the fluid. The top 72 may be fabricated of brick or other similar material whereby it may withstand heat or other chemicals to which it may be disposed.

The output pipes 20 may be of coaxial configuration, including inner conducting pipes 80, 81 and 82 surrounded by outer encasing pipes 83, 84 and 85, respectively. The outer encasing pipes 83, 84 and 85 extend only along a portion of the length of the conducting pipes 80, 81 and 82 into the tank 70 terminating at ends 202, 204 and 206, respectively, to provide a water return thereto as below described in detail. Both the pipes 80, 81 and 82 and the surrounding portions therealong, 83, 84 and 85, communicate directly to within the chimney 13 of the furnace 10. The pipes 80, 81 and 82 are traversed over a portion of their length through the tank 70 containing a fluid, such as water 90, or the like. The tank 70 may include an outer wall 91 within which the water 90 may be contained, and the level thereof may be controlled by water input pipe 92 together with a control valve 93. Additionally communicating with the water tank 70 is an output water pipe 100 which communicates to within the interior of chimney 13 of the furnace 10. At that interior point, a spray nozzle 101 may be placed adjacent the point at which the pipes 80, 81 and 82 and their surrounding coaxial counterparts 83, 84 and 85 communicate to within the chimney 13. The water in the pipe 100 is controlled by a pump 105 and a check valve 106 in the lines. Thus, the water from within the tank 70 may be pumped by pump 105 through check valve 106 within pipe 100 to be sprayed from the outlet 101 into the space between the pipes 80, 81 and 82 and their corresponding coaxial parts 83, 84, and 85 to minimize the heat produced thereat. The water is thereafter conducted between the pipes 80, 81, and 82 and their coaxial counterparts 83, 84, and 85 to be returned to the within the tank 70 in a recirculating fashion, the water being discharged into the tank 70 at the ends 202, 204 and 206 of the pipes 83, 84 and 85.

Because the pressure within the furnace 10 and, consequently, within the chimney 13 may reach excessive amounts, a cap 110 over the chimney outlet 111 may be provided. The cap 110 may be hinged by a hinge 112 via shafts 113 and 114 to be controlled at ground level by a manual control 118. Thus, if the pressure reaches an undesirably high level, the lever 114 may be manually operated to open the lid 110 over the opening 111 of chimney 13. To maintain the opening of the lid 110, a plurality of teeth 120 into which a handle member 121 may be disposed may be conveniently provided.

On the other hand, if the pressure within the furnace 10 and its chimney 13 is insufficient to force the output into the treating tank 50, pumps 130, 131, and 132 are provided within the respective output pipes 80, 81, and 82. To prevent the fluid within the treating tank 50 from flowing downwardly into the conducting pipes 80, 81, and 82, check valves 140, 141, and 142 may be provided in their respective conducting lines 80, 81, and 82.

Because the fluid 65 within the treating tank 50 may become expended in use, an inspection plate 150 may be provided through the wall of the tank, through which chemicals or the like may be added to the fluid, or the fluid's condition inspected. Likewise, to drain the fluid from the tank, a second inspection plate 151 may be provided near the base of the input section 51, through which the fluid may be viewed, or through which the fluid may be drained, as desired.

Although the invention has been described with a certain degree of particularity, it is understood that the present disclosure was made only by way of example, and that numerous changes and modifications may be made without departing from the spirit and scope of the invention as hereinafter claimed.

I claim:

1. A system for treating the output from the furnace; comprising:

a chimney conducting the output from the furnace;

a treatment tank adjacent the furnace;

three pipes interconnecting the chimney and the base of said treatment tank for conducting the output of the furnace from the chimney to within the treatment tank;

three pumps, one in each of said three lines to pull the output from within the chimney and force it into said treatment tank;

a fluid within said treatment tank through which the output of a furnace is forced;

baffle means within said fluid above said three pipes to prevent agitation of the fluid within said tank;

a burner extending substantially across the tank to burn the output of the furnace after it has traversed the fluid;

means for supplying the fluid to within the tank;

means for controlling the fluid flow within said means for supplying the fluid to within said tank;

three coaxial sleeves disposed about said three pipes along a portion of their length;

a fluid containing tank through which said pipes are disposed and into which said coaxial sleeve opens;

a pipe communicating to within said fluid containing tank and extending to within the chimney adjacent the connection of said pipes thereto;

pump means within said pipe to pump fluid from said fluid containing tank to force it to said coaxial sleeve, whereby said three pipes and chimney are cooled by the fluid from said fluid containing tank, and the fluid is recirculated to the fluid containing tank through the coaxial sleeves.

2. The system of claim 1 further comprising a lid on a hole in said chimney, a handle connecting said lid and extending to near the ground adjacent the furnace, whereby, when the pressure within the chimney may be regulated by manipulating the handle to open and close the lid over the hole in said chimney.

3. The system of claim 2 further comprising covers over holes within said treating tank, one above the fluid level and one below the fluid level through which chemicals may be added to the fluid, and the fluid drained.

4. The system of claim 3 further comprising a pump within each of said coaxial sleeves to draw the fluid from said fluid containing tank discharged from said pipe therethrough to recirculate it to said fluid containing tank.

* * * * *